(12) United States Patent
Chen et al.

(10) Patent No.: US 9,810,882 B2
(45) Date of Patent: Nov. 7, 2017

(54) OPTICAL LENS

(71) Applicant: ABILITY ENTERPRISE CO., LTD, New Taipei (TW)

(72) Inventors: Jung-Yao Chen, New Taipei (TW); Yu-Min Chang, New Taipei (TW); Yun-Yi Lin, New Taipei (TW); Chun-Lin Huang, New Taipei (TW)

(73) Assignee: ABILITY ENTERPRISE CO., LTD, New Taipei (TW)

( * ) Notice: Subject to any disclaimer, the term of this patent is extended or adjusted under 35 U.S.C. 154(b) by 0 days.

(21) Appl. No.: 15/190,200

(22) Filed: Jun. 23, 2016

(65) Prior Publication Data

US 2016/0377839 A1  Dec. 29, 2016

(30) Foreign Application Priority Data

Jun. 25, 2015  (TW) .............................. 104120513 A

(51) Int. Cl.
| | | |
|---|---|---|
| *G02B 13/18* | (2006.01) | |
| *G02B 3/02* | (2006.01) | |
| *G02B 13/00* | (2006.01) | |
| *G02B 9/64* | (2006.01) | |

(52) U.S. Cl.
CPC ........... *G02B 13/0045* (2013.01); *G02B 9/64* (2013.01)

(58) Field of Classification Search
CPC .. G02B 13/0045; G02B 27/0025; G02B 9/64; H04N 5/2254
USPC ......................................... 359/708, 751, 755
See application file for complete search history.

(56) References Cited

U.S. PATENT DOCUMENTS

2016/0139372 A1* 5/2016 Tanaka ............... G02B 13/0045
359/708

* cited by examiner

*Primary Examiner* — Alicia M Harrington
(74) *Attorney, Agent, or Firm* — CKC & Partners Co., Ltd.

(57) ABSTRACT

An optical lens includes seven lenses. An first lens has a negative refractive power: an second lens, an third lens, an fifth lens, an sixth lens and an seventh lens have refractive powers respectively, and the fourth lens has a positive refractive power. One of the second lens and the third lens has a positive refractive power, and the other has a negative refractive power. One of the fifth lens and the sixth lens has a positive refractive power and the other has a negative refractive power. An object-side surface of the first lens has a refractive rate R1, an image-side surface of the first lens has a refractive rate R2, and |R2/R1|≤0.01.

18 Claims, 4 Drawing Sheets

OPTICAL LENS

RELATED APPLICATION

This application claims priority to Taiwan Application Serial Number 104120513, filed Jun. 25, 2015, which is herein incorporated by reference.

BACKGROUND

Technical Field

The present invention relates to an optical lens. More particularly, the present invention relates to an optical lens with a small size and excellent imaging quality.

Description of Related Art

Recently, with the increasing technology advances of smart phones and handheld tablet computers, a variety of the mobile devices require high optical image quality. Due to the lightweight and thin design of mobile devices, the thickness of the optical lens for the photographic device is required to be reduced. Generally, the optical lens has a plurality of lenses. The miniaturization and high definition are always the goals of the related product development to enhance the market competitiveness.

Hence, there is an imperious need for miniaturization and better imaging quality of a new optical lens.

SUMMARY

The invention relates to an optical lens which achieves the small size and better imaging quality.

The invention provides an optical lens. The optical lens in order from an object side to an image side includes a first lens, a second lens, a third lens, a fourth lens, a fifth lens, a sixth lens and a seventh lens. The first lens has a negative refractive power; the second lens has a refractive power; the third lens has a refractive power; the fourth lens has a positive refractive power, and the fifth lens, the sixth lens and the seventh lens have refractive powers respectively. One of the second lens and the third lens has a positive refractive power, and the other has a negative refractive power. One of the fifth lens and the sixth lens has a positive refractive power and the other has a negative refractive power.

The invention provides another optical lens. The optical lens in order from an object side to an image side includes a first lens, a second lens, a third lens, a fourth lens, a fifth lens, a sixth lens and a seventh lens. The first lens has a negative refractive power; the second lens has a refractive power; the third lens has a refractive power; the fourth lens has a positive refractive power, the fifth lens has a refractive power; the sixth lens has a refractive power; the seventh lens has a refractive power. An object-side surface of the first lens has a refractive rate R1, an image-side surface of the first lens has a refractive rate R2, and $|R2/R1|\leq 0.01$.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed descriptions of the embodiments, with reference made to the accompanying drawings as follows.

DETAILED DESCRIPTION

Reference will now be made in detail to the present embodiments of the invention, examples of which are illustrated in the accompanying drawings. In addition to those described in detail, the invention also can be widely implemented in other embodiments, easily substitute any of the embodiments, modifications, equivalents variations are included within the scope of the case, and after claim prevail. In the description of the specification, in order to enable the reader to understand the invention more completely, provides a number of specific details; however, the invention can still be implemented under the premise of some or all of these specific details being omitted. In addition, well-known steps or elements not described in detail to avoid unnecessary restrictions on the invention. Drawings identical or similar elements will be the same or similar symbols. Of particular note, the drawings are illustrative only and do not represent the actual size or the number of elements, unless otherwise stated.

Figure 1:
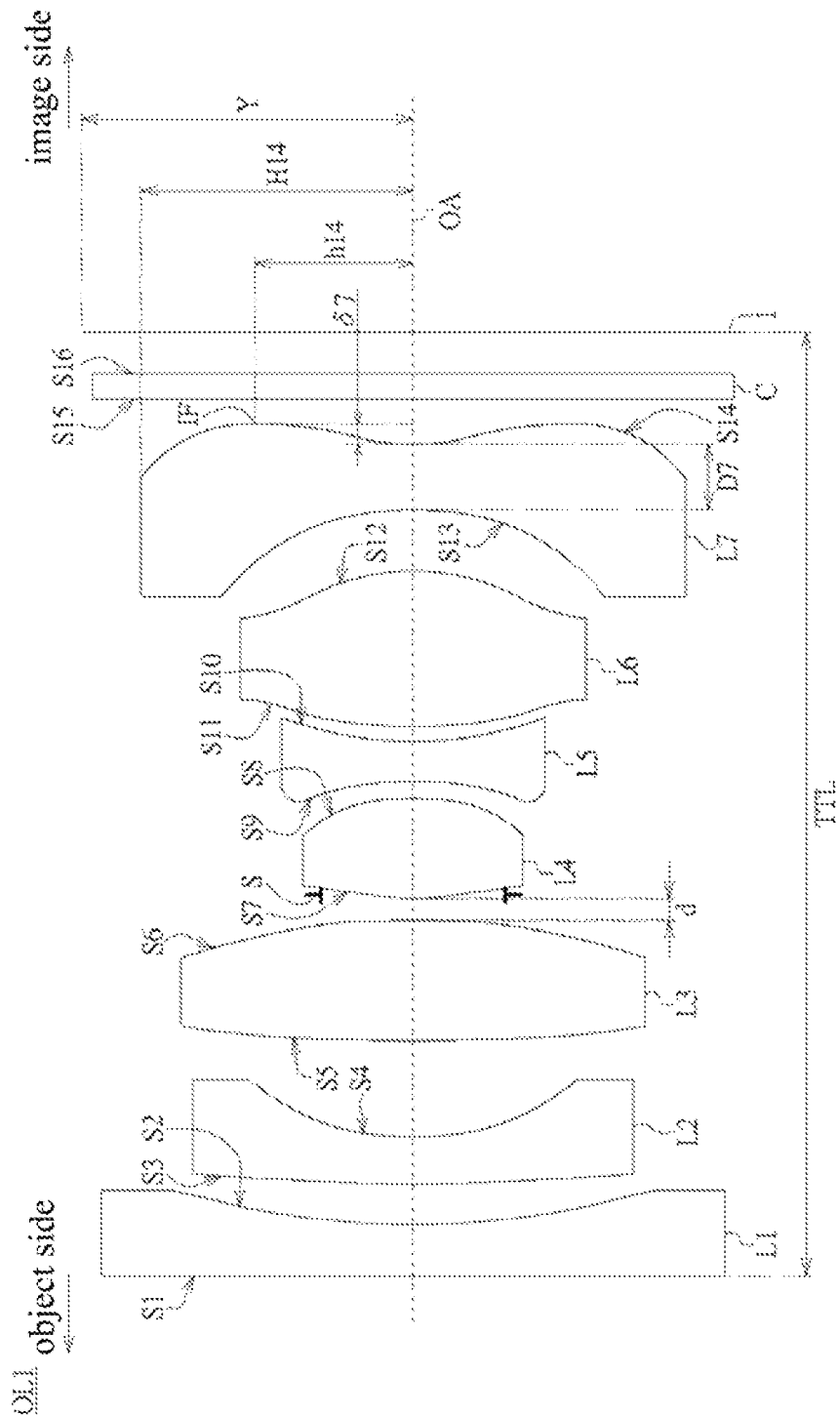
FIG. 1 is a schematic diagram of an optical lens in accordance with an embodiment of the present disclosure.

FIG. 1 is a schematic diagram of an optical lens OL1 in accordance with one embodiment of the present disclosure. To highlight the features of the present embodiment, only the structure related to the present embodiment is illustrated, and other structures are omitted. The optical lens OL1 of the present embodiment may be a wide-angle lens, which may be, but not limited to, a wide-angle prime lens. The optical lens OL1 can be applied to a device capable of projecting or capturing an image, and the device may be, but not limited to, a hand-held computer system, a hand-held communication system, a vehicle camera device, a monitoring system, a digital camera, a digital video camera or a projector.

In this embodiment, the optical lens OL1 includes a first lens group and a second lens group. The first lens group includes one or more than one lens, and the first lens group has a positive refractive power. The second lens group includes one or more than one lens, and the second lens group has a negative refractive power.

As shown in FIG. 1, the optical lens OL1, from an object side to an image side, mainly includes a first lens L1, a second lens L2, a third lens L3, a fourth lens L4, a fifth lens L5, a sixth lens L6 and a seventh lens L7. The first lens L1, the second lens L2 and the third lens L3 may belong to the first lens group, and the fourth lens L4, the fifth lens L5, the sixth lens L6 and the seventh lens L7 may belong to the second lens group. In addition, the first lens L1, the second lens L2, the third lens L3, the fourth lens L4, the fifth lens L5, the sixth lens L6 and the seventh lens L7 can be arranged along an optical axis OA.

In some embodiments, on the optical axis OA, the first lens L1 may have a refractive power, such as a negative refractive power; the second lens L2 and the third lens L3 may have refractive powers respectively, such as a positive refractive power and/or a negative refractive power; the fourth lens L4 may have a refractive power, such as a positive refractive power; the fifth lens L5 and the sixth lens L6 may have refractive powers respectively, such as a positive refractive power and/or a negative refractive power; the seventh lens L7 may have a refractive power, such as a negative refractive power.

In some embodiments, the refractive power of the second lens L2 and the refractive power of the third lens L3 may be corresponding set to each other. For example, if one of the second lens L2 and the third lens L3 has a positive refractive power, the other has a negative refractive power.

In some embodiments, the refractive power of the fifth lens L5 and sixth lens L6 may be correspondingly set to each other. For example, if one of the fifth lens L5 and the sixth lens L6 has a positive refractive power, the other has a negative refractive power.

In some embodiments, the optical lens OL1 may satisfy the condition of |R2/R1|≤0.01, wherein R1 is a refractive rate of an object-side surface S1 of the first lens L1, and R2 is a refractive rate of an image-side surface S2 of the first lens L1.

In some embodiments, the optical lens OL1 may satisfy at least one of the following conditions: 0.25≤F/TTL, F/TTL≤0.45 and/or 0.25≤F/TTL≤0.45, wherein F is a focal length of the optical lens OL1. TTL may be defined as a distance from the object-side surface S1 of the first lens L1 to an image plane I along the optical axis OA, or TTL may be defined as a substantially perpendicular distance from a center of the object-side surface S1 of the first lens L1 to the image plane I.

In some embodiments, the optical lens OL1 may satisfy at least one of the following conditions: 0.2≤F/Y, F/Y≤0.6 and/or 0.2≤F/Y≤0.6. Y is an image height of the optical lens OL1. Furthermore, in other embodiments, the optical lens OL1 may further satisfy at least one of the following conditions: 0.25≤F/Y 0.3≤F/Y, F/Y≤0.5 and F/Y≤0.55.

In some embodiments, the optical lens OL1 may satisfy the condition of (FNO×TTL)/(FOV×Y)≤0.03. FOV is a field-of-view of the optical lens OL1, and FNO is an aperture of the optical lens OL1. More particularly, in other embodiments, the optical lens OL1 may further satisfy the condition of 0.1≤(FNO×TTL)/(FOV×Y)≤0.03.

In some embodiments, the optical lens OL1 may satisfy at least one of the conditions: 0.0≤d/F, d/F≤0.1 and/or 0.0≤d/F≤0.1. d may be defined as a distance between the first lens group and the second lens group, or d may be defined as a distance from an image-side surface S6 of the third lens L3 to an object-side surface S7 of the fourth lens L4 along the optical axis OA. More particularly, in other embodiments, the optical lens OL1 may further satisfy at least one of the following conditions: 0.0≤d/F≤0.08, 0.05≤d/F≤0.1 and/or 0.05≤d/F≤0.08.

Moreover, in some embodiments, at least one of the first lens L1, the second lens L2 and the third lens L3 may be a glass lens made of a glass material; in other embodiments, at least one of the second lens L2, the third lens L3, the fourth lens L4, the fifth lens L5, the sixth lens L6 and the seventh lens may be a plastic lens made of a plastic material.

For example, the first lens L1 may be a glass lens, and at beast one of the second lens L2, the third lens L3, the fourth lens L4, the fifth lens L5, the sixth lens L6 and the seventh lens L7 may be a plastic lens; alternatively, the fourth lens L4, the fifth lens L5, the sixth lens L6 and the seventh lens L7 may all be, but not limited to, the plastic lenses. The material of the plastic lenses may include, but not limited to polycarbonate, cyclenes copolymer (such as APEL), polyester resin (such as OKP4 or OKP4HT), and so no, or any combination thereof.

In some embodiments, the first lens L1, the second lens L2, the third lens L3, the fourth lens L4, the fifth lens L5, the sixth lens L6 and the seventh lens L7 may be a spherical lens, an aspheric lens and/or a free-form lens respectively. Particularly, each free-form lens has at least one free-form surface, that is an object-side surface and/or an image-side surface of the free-form lens are/is the free-form surface(s). And, each aspheric lens has at least one aspheric surface, that is an object-side surface and/or an image-side surface of the aspheric lens are/is the aspheric surface(s). Each the aspheric surface may satisfy the following equation:

$$Z = \left[\frac{(C*Y^2)}{1+\sqrt{1-(K+1)C^2X^2}}\right] + \sum(A_i * X^i)$$

Wherein Z is a coordinate value on the optical axis OA, and the direction in which the light beams propagate is defined as a positive along the optical axis OA. $A_4$, $A_6$, $A_8$, $A_{10}$, $A_{12}$, $A_{14}$ and $A_{16}$ are aspheric coefficients and K is a coefficient of quadratic surface. C is reciprocal of r (C=1/r), in which r is the curvature radius. X is the coordinate value on a direction orthogonal to the optical axis OA, in which a direction away from the optical axis OA is defined as positive. Furthermore, each of the parameters or the coefficients of the equation of each aspheric surface may be individually set to determine the focal length of each position on the aspheric surfaces.

In other embodiments, the first lens L1 may be a spherical lens, and at least one of the second lens L2, the third lens L3, the fourth lens L4, the fifth lens L5, the sixth lens L6 and the seventh lens L7 may be the aspheric lens or the free-form lens respectively.

In some embodiments, the first lens L1 may be a spherical lens, and the second lens L2 and/or the third lens L3 may also be a spherical lens. At least one of the fourth lens L4, the fifth lens L5, the sixth lens L6 and the seventh lens L7 may be an aspheric lens or the free-form lens respectively.

In some embodiments, the first lens L1 may be a spherical lens, and the second lens L2, the third lens L3, the fourth lens L4, the fifth lens L5, the sixth lens L6 and the seventh lens L7 are all aspheric lenses. For example, the first lens L1 may be the spherical lens wherein the object-side surface S1 and the image-side surface S2 are all spherical surfaces. The second lens L2, the third lens L3, the fourth lens L4, the fifth lens L5, the sixth lens L6 and the seventh lens L7 may be all aspheric lenses, in which the object-side surfaces and the image-side surfaces are all aspheric surfaces. More particularly, the object side surface S1 of the first lens L1 may has a substantially maximal refractive rate, for example, the refractive rate is nearly infinite. In other words, the object-side surface S1 of the first lens L1 may be a substantially flat.

Moreover, in some embodiments, the object-side surface S1 of the first lens L1 may be nearly a plane or substantially a plane, and the object-side surface S1 may be a positive refractive rate, the negative refractive rate or the substantially infinite refractive rate at the optical axis OA. The image-side surface S2 may be a concave surface which recesses toward the object side, and the image-side surface S2 has a positive refractive rate at the optical axis OA. More particularly, the first lens L1 may adopt a lens having the negative refractive power, and the lens could be, but not limited to, a convex-concave lens, a biconcave lens or a plano-concave lens having the negative refractive power, such as a convex-concave glass lens, a biconcave glass lens or the plano-concave glass lens. The image-side surface S2 may be a spherical surface.

An object-side surface S3 of the second lens L2 and an object-side surface S5 of the third lens L3 may both be convex surfaces protruding toward the object side, and the object-side surfaces S3 and S5 have positive refractive rate at the optical axis OA. Image-side surfaces S4 and S6 of the second lens L2 and the third lens L3 may be a concave surfaces recessing toward the object side and/or a convex surfaces protruding toward the image side respectively, and the image-side surfaces S4 and S6 have refractive rates respectively at the optical axis OA, such as the positive refractive rates and/or the negative refractive rates. More particularly, the second lens L2 and the third lens L3 may respectively adopt the lenses having refractive powers respectively, such as the negative refractive power or the positive refractive power. The second lens L2 and the third lens L3 could respectively be, but not limited to, a convex-concave lens having the negative refractive power or a biconvex lens having the positive refractive power, such as a convex-concave plastic lens, a biconvex glass lens, a convex-concave glass lens or a biconvex plastic lens. The object-side surfaces S3 and S5 may be a spherical surface or an aspheric surface respectively, and the image-side surfaces S4 and S6 may be a spherical surface or an aspheric surface respectively.

The object-side surface S7 of the fourth lens L4 may be a convex surface protruding toward the object side, and the object-side surface S7 has a positive refractive rate at the optical axis OA. An image-side surface S8 of the fourth lens L4 may be a convex surface protruding toward the image side, and the image-side surface S8 has a negative refractive rate at the optical axis OA. More particularly, the fourth lens L4 could adopt a lens having the positive refractive power, and the lens may be, but not limited to, a biconvex lens having the positive refractive power, such as a biconvex plastic lens or a biconvex glass lens. The object-side surface S7 may be a spherical surface or an aspheric surface, and the image-side surface S8 may be a spherical surface or an aspheric surface.

An object-side surface S9 of the fifth lens L5 may be a concave surface recessing toward the image side or a convex surface protruding toward the object side, and the object-side surface S9 has a refractive rate at the optical axis OA, such as a negative refractive rate or a positive refractive rate. An image-side surface S10 may be a concave surface recessing toward the object side or a convex surface protruding toward the image side, and the it age-side surface S10 has a refractive rate at the optical axis OA, such as a positive refractive rate or a negative refractive rate. In particular, the fifth lens L5 may adopt a lens having a negative refractive power or a lens having a positive refractive power, and the lens could be, but not limited, to, a biconcave lens having the negative refractive power or a biconvex lens having the positive refractive power, such as a biconcave plastic lens, a biconvex plastic lens, a biconcave glass lens or a biconvex glass lens. The object-side surfaces S9 may be a spherical surface or an aspheric surface, and the image-side surface S10 may be a spherical surface or an aspheric surface.

An object-side surface S11 of the sixth lens L6 may be a convex surface protruding toward the object side, and the sixth lens L6 has a positive refractive rate at the optical axis OA. An image-side surface S12 of the sixth lens L6 may be a convex surface which protrudes toward the image side or a concave surface which recesses toward the object side, and the image-side surface S12 has a refractive rate at the optical axis OA, such as a negative refractive rate or a positive refractive rate. More particularly, the sixth lens L6 could adopt a lens having the positive refractive power or having the negative refractive power, and the lens may be, but not limited to a biconvex lens having the positive refractive power or a convex-concave lens having the negative refractive power, such as a biconvex plastic lens, a convex-concave plastic lens, a biconvex glass lens or a convex-concave glass lens. The object-side surface S11 may be a spherical surface or an aspheric surface, and the image-side surface S12 may be a spherical surface or an aspheric surface.

An object-side surface S13 of the seventh lens L7 is a concave surface recessing toward the image side or a convex surface protruding toward the object side, and the object-side surface S13 has a negative refractive rate at the optical axis OA. An image-side surface S14 is formed in a substantially convex shape which protrudes toward the image side, and a portion of the image-side surface S14 near and/or around the optical axis OA is formed in a concave shape which recesses toward the object side. The image-side surface S14 has a positive refractive rate at the optical axis OA. More particularly, the seventh lens L7 could adopt a lens having the negative refractive power, and the lens may be, but not limited to, a biconcave lens having the negative refractive power or a convex-concave lens having the negative refractive power, such as a biconcave plastic lens, a convex-concave plastic lens, a biconcave glass lens or a convex-concave glass lens. The object-side surface S13 may be a spherical surface or an aspheric surface, and the image-side surface S14 may be a spherical surface er an aspheric surface.

In some embodiments, the first lens L1, the fourth lens L4, the fifth lens L5, the sixth lens L6 and the seventh lens L7 are the aspheric lenses which having the refractive powers respectively. In particular, the first lens L1 may be a plano-concave aspheric glass lens having a refractive, power, and the fourth lens L4 may be a biconvex aspheric plastic lens having a positive refractive power. The fifth lens L5, the sixth lens L6 and the seventh lens L7 may be aspheric plastic lenses having refractive powers respectively.

Moreover, in other embodiments, the refractive powers of the fourth lens L4, the fifth lens L5, the sixth lens L6 and the seventh lens L7 may be alternately set in positive refractive powers and negative refractive powers. For example, the refractive powers of the fourth lens L4, the fifth lens L5, the sixth lens L6 and the seventh lens L7 could be set in the order of positive, negative, positive and negative or could be in the order of negative, positive, negative and positive.

Moreover, in other embodiments, the seventh lens L7 of the optical lens OL1 may adopt an aspheric lens, and the image-side surface S14 is an aspheric surface having at least one inflection point IF. A distance from the inflection point IF to the optical axis OA is h14, and a radius of the seventh lens L7 is H14. The optical lens OL1 may satisfy at least one of the following conditions: $0.5 \leq |h14/H14|$, $|h14/H14| \leq 0.8$, and $0.5 \leq |h14/H14| \leq 0.8$. More particularly, in other embodiments, the optical lens OL1 may further satisfy at least one of the following conditions: $0.6 \leq |h14/H14|$, $0.6 \leq |h14/H14| \leq 0.8$, $|h14/H14| \leq 0.7$, $0.5 \leq |h14/H14| \leq 0.7$ and $0.6 \leq |h14/H14| \leq 0.7$.

Particularly, h14 may be a shortest distance or a perpendicular distance from the inflection point IF of the seventh lens L7 to the optical axis OA. Moreover, the inflection point IF may be located on the image-side surface S14, in which the region range from the portion near the optical axis OA to an edge of the seventh lens L7. H14 may be an effective diameter or an optical effective diameter of the seventh lens L7, or H14 may be a distance from the edge of the seventh lens L7 to the optical axis OA, such as a shortest distance or a perpendicular distance.

Moreover, in some embodiments, the optical lens OL1 may satisfy the condition of |δ7/D7|≤0.4. The image-side surface S14 and the optical axis OA intersects at an intersection, and a distance from the intersection to a projection which the inflection point IF projects at the optical axis OA is a δ7. D7 may be a thickness of the seventh lens L7 on the optical axis OA, or D7 may be a center thickness of the seventh lens L7. More particularly, in other embodiments, the optical lens OL1 may further satisfy at least one of the following conditions: 0≤|δ7/D7|≤0.4, 0.1≤|δ7/D7|≤0.4 or 0.2≤|δ7/D7|≤0.4.

Particularly, if the mage-side surface S14 of the seventh lens L7 is an aspheric surface, the variation of the image-side surface S14 of the seventh lens L7, from the edge to the center, may extending toward the image plane I and then extending away the image plane I. The inflection point IF of the seventh lens L7 may be the turning point. In other words, the inflection point IF is substantially the point of the image-side surface S14 which is closest to the image plane I.

Furthermore, as shown in FIG. 1, the optical lens OL1 further includes a stop St and/or a cover C. Moreover, an image capture unit (not shown in the figure) may be set at the image plane I and may convert light beams through the optical lens OL1 into electrical signals. The stop St may be disposed between any two of the lens L1~L7 of the optical lens OL1, disposed on the object-side of the first lens L1, or disposed between the seventh lens L7 and the image plane I. For example, the stop St may be, but not limited to, disposed between the third lens L3 and the fourth lens L4. The cover C may be disposed between the seventh lens L7 and the image plane I.

On the other hand, a filter film (not shown) may be formed on an object-side surface S15 and/or on an image-side surface S16 of the cover C and it may filter infrared beams. Furthermore, the optical lens OL1 may further include a filter (not shown) disposed between the seventh lens L7 and the cover C. Moreover, in other embodiments, the function of protecting the image capture unit and filtering infrared beams may be integrated into the cover C.

Table I presents details of an embodiment of the optical lens OL1, which includes refractive rates, thicknesses, refractive indexes, dispersion coefficients. The "Surface" means each interface, for example, "S" means the stop St, "S1" means the object-side surface S1 of the first lens L1, "S2" means the image-side surface S2 of the first lens L1, and so on. In addition, "Thickness" means a distance from the specific surface to the next adjacent surface toward the image direction, for example, the thickness of the object-side surface S1 means the distance from the object-side surface S1 to the image-side surface S2.

TABLE I

| Lens | Surface | Refractive Rate (mm) | Thickness (mm) | Refractive Index nd | Dispersion Coefficient vd |
|---|---|---|---|---|---|
| L1 | S1 | ∞ | 0.449 | 1.510 | 64.0 |
|  | S2 | 7.952 | 0.319 |  |  |
| L2 | S3 | 6.562 | 0.397 | 1.530 | 57.0 |
|  | S4 | 2.217 | 0.839 |  |  |
| L3 | S5 | 17.4341 | 1.026 | 1.830 | 37.0 |
|  | S6 | −6.473 | 0.228 |  |  |
| St | S | ∞ | −0.039 |  |  |
| L4 | S7 | 2.880 | 0.851 | 1.530 | 57.0 |
|  | S8 | −1.897 | 0.114 |  |  |
| L5 | S9 | −5.237 | 0.372 | 1.630 | 23.0 |
|  | S10 | 2.410 | 0.122 |  |  |
| L6 | S11 | 5.257 | 1.333 | 1.530 | 57.0 |
|  | S12 | −1.658 | 0.499 |  |  |
| L7 | S13 | −4.462 | 0.585 | 1.530 | 57.0 |
|  | S14 | 1.961 | 0.369 |  |  |
| C | S15 | ∞ | 0.210 | 1.510 | 64.0 |
|  | S16 | ∞ | 0.370 |  |  |
|  | I | ∞ |  |  |  |

In addition, if surfaces of the second lens L2, the fourth lens L4, the fifth lens L5, the sixth lens L6 and the seventh lens L7 are aspheric surfaces, each parameter of the aspheric equation is shown in Table II.

TABLE II

|  | S3 | S4 | S7 | S8 | S9 |
|---|---|---|---|---|---|
| K | −2.0381E+01 | −6.7805E−01 | −5.2422E+00 | 1.4787E+00 | 6.9541E+00 |
| A4 | −1.1974E−02 | 4.0700E−04 | 1.0352E−02 | 5.6866E−02 | −6.8508E−02 |
| A6 | −1.2076E−03 | 2.7699E−03 | −5.8590E−02 | −9.3829E−02 | −2.6431E−02 |
| A8 | 5.0840E−04 | 7.7018E−04 | 1.2055E−01 | 4.4791E−02 | 3.5627E−02 |
| A10 | 3.0146E−05 | 1.2351E−04 | −9.1808E−02 | 5.2620E−02 | −2.0676E−03 |
| A12 | −7.8386E−06 | −3.7435E−04 | −4.1860E−01 | −1.3440E−01 | −2.4837E−02 |
| A14 | −7.3220E−07 | 3.0025E−04 | 4.5152E−01 | 6.7459E−02 | 2.0967E−02 |
| A16 | 0.0000E+00 | 0.0000E+00 | 0.0000E+00 | 0.0000E+00 | 0.0000E+00 |

|  | S10 | S11 | S12 | S13 | S14 |
|---|---|---|---|---|---|
| K | −9.0878E+00 | 9.1039E+00 | −5.4778E+00 | 2.8140E+00 | −6.6953E−01 |
| A4 | −4.7546E−03 | 1.6814E−02 | −6.2190E−02 | −7.5311E−02 | −1.6900E−01 |
| A6 | 1.8413E−02 | −3.7451E−03 | 3.2815E−02 | −7.0486E−02 | 6.3491E−02 |
| A8 | −1.1565E−02 | 2.0168E−03 | 1.5900E−03 | 1.4699E−01 | −1.7815E−02 |
| A10 | 4.8441E−03 | −2.2819E−03 | −2.4743E−03 | −1.1392E−01 | 2.9086E−03 |
| A12 | 4.8895E−04 | 3.9393E−04 | 5.4922E−04 | 4.7981E−02 | −2.4265E−04 |
| A14 | −5.7720E−04 | 3.4687E−04 | 2.1348E−04 | −1.0924E−02 | 3.2774E−06 |
| A16 | 0.0000E+00 | −1.5360E−04 | −8.7840E−05 | 1.0469E−03 | 6.3107E−07 |

Figure 2:
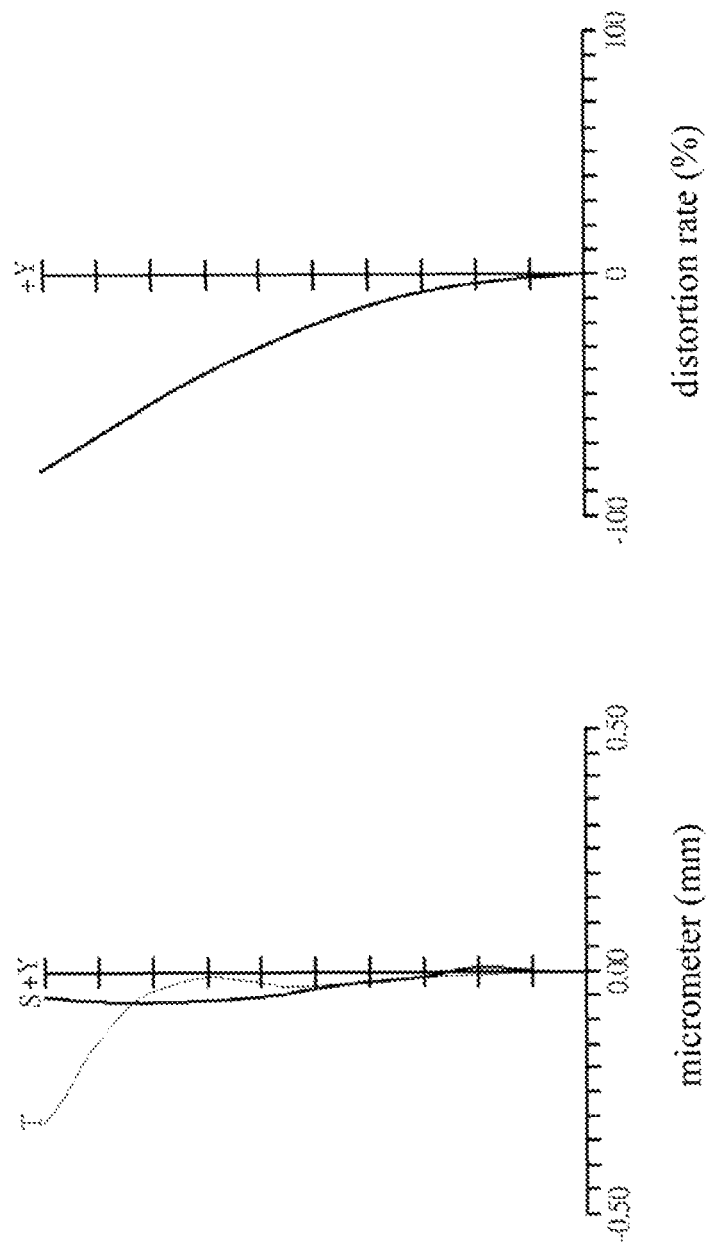
FIG. 2A is a diagram illustrating of a field curvature of the optical lens in the FIG. 1.
FIG. 2B is a diagram illustrating of a distortion of the optical lens in the FIG. 1.

FIG. 2A is a field curvature graph of the optical lens OL1 in the FIG. 1. The curves T and S display for aberrations of the optical lens OL1 to tangential beams and sagittal beams. As shown in the drawing the tangential values and the sagittal values of light beams are all controlled within favorable ranges.

FIG. 2B is a diagram illustrating distortion of the optical lens OL1 in the FIG. 1. As shown in the drawing, the distortion values for light beams are all controlled within favorable ranges.

Figure 3:
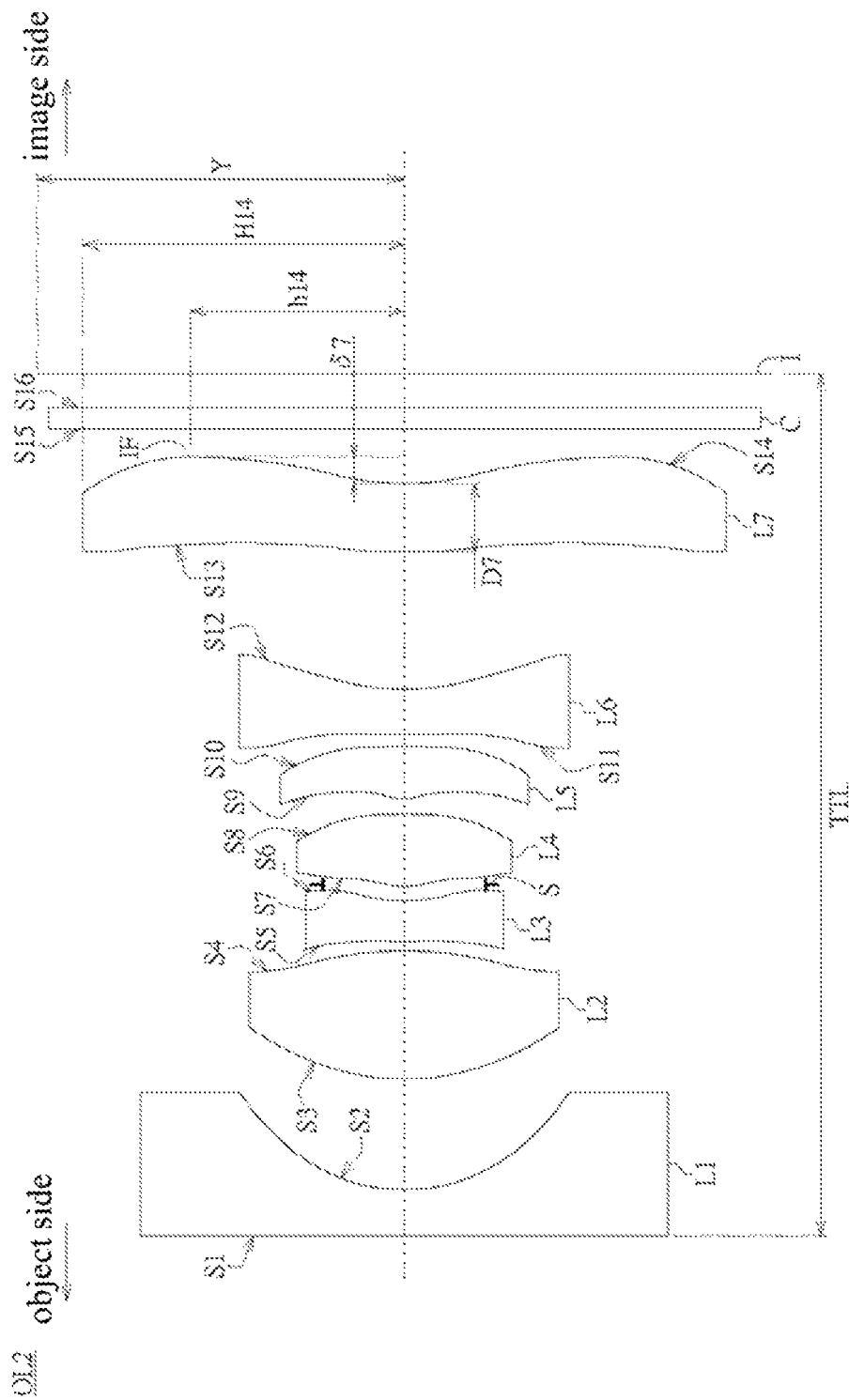
FIG. 3 is a schematic diagram of an optical lens in accordance with another embodiment of the present disclosure.

FIG. 3 is a schematic diagram of an optical lens OL2 in accordance with another embodiment of the present disclosure. The structure of the optical lens OL2 of this present embodiment is similar to the optical lens OL1, and the main difference from the optical lens OL1 is: materials, shapes and/or optical parameters of the second lens L2, the third lens L3, the fifth lens L5, the sixth lens L6 and the seventh lens L7.

As shown in FIG. 3, an image-side surface Set of the second lens L2 of the optical lens OL2 may be a convex surface protruding toward the image side, and the image-side surface S4 has a negative refractive rate at the optical axis OA. The second lens L2 may be a biconvex lens having the positive refractive power, such as a biconvex glass lens or a biconvex plastic lens. Moreover, at least one of the object-side surface S3 and the image-side surface S4 may be a spherical surface.

An image-side surface S6 of the third lens L3 may be a concave surface recessing toward the object side, and the image-side surface S6 of has a positive refractive rate at the optical axis OA. The third lens L3 may be a convex-concave lens having the negative refractive power, such as a convex-concave plastic lens or a convex-concave glass lens. Moreover, the object-side surface S3 may be an aspheric surface.

An object-side surface S9 of the fifth lens L5 may be a convex surface protruding toward the object side, and the object-side surface S9 has a positive refractive rate at the optical axis OA. An image-side surface S10 may be a convex surface protruding toward the image side, and the image-side surface S10 has a negative refractive rate at the optical axis OA, The fifth lens L5 may be a biconvex lens having the positive refractive power, such as a biconvex plastic lens or a biconvex glass lens. Moreover, at least one of the object-side surface S9 and the image-side surface S10 may be an aspheric surface.

An image-side surface S12 of the sixth lens L6 is a concave surface which recesses toward the object side, and it has a positive refractive rate at the optical axis OA. The sixth lens L6 may be a convex-concave lens having the negative refractive power, such as the convex-concave plastic lens or the convex-concave glass lens. The object-side surface S3 may be an aspheric surface.

An object-side surface S13 of the seventh lens L7 may be a convex surface protruding toward the object side, and the object-side surface S13 has a negative refractive rate at the optical axis OA. The seventh lens L7 may be a convex-concave lens having the negative refractive power, such as a convex-concave plastic lens or a convex-concave glass lens. The object-side surface S13 may be an aspheric surface.

Table III presents details of an embodiment of the optical lens OL2, which includes refractive rates, thicknesses, refractive indexes, dispersion coefficients.

TABLE III

| Lens | Surface | Refractive Rate (mm) | Thickness (mm) | Refractive Index nd | Dispersion Coefficient vd |
|---|---|---|---|---|---|
| L1 | S1 | ∞ | 0.500 | 1.720 | 54.0 |
|  | S2 | 1.972 | 1.180 |  |  |
| L2 | S3 | 2.799 | 1341 | 1.620 | 35.0 |
|  | S4 | −5.073 | 0.084 |  |  |
| L3 | S5 | 20.195 | 0.454 | 1.640 | 22.0 |
|  | S6 | 2.659 | 0.170 |  |  |
| St | S | ∞ | 0.012 |  |  |
| L4 | S7 | 3.652 | 0.720 | 1.530 | 56.0 |
|  | S8 | −5.291 | 0.190 |  |  |
| L5 | S9 | 3.376 | 0.535 | 1.530 | 56.0 |
|  | S10 | −4.406 | 0.093 |  |  |
| L6 | S11 | 212.760 | 0.484 | 1.610 | 25.0 |
|  | S12 | 2.723 | 1.454 |  |  |
| L7 | S13 | 4.724 | 0.754 | 1.640 | 22.0 |
|  | S14 | 2.999 | 0.555 |  |  |
| C | S15 | ∞ | 0.210 | 1.510 | 64.0 |
|  | S16 | ∞ | 0.370 |  |  |
|  | I | ∞ | 0.500 | 1.720 | 54.0 |

In addition, if surfaces of the third lens L3 to the seventh lens L7 are aspheric surfaces, each parameter of the aspheric equation is shown in Table IV.

TABLE IV

|  | S5 | S6 | S7 | S3 | S9 |
|---|---|---|---|---|---|
| K | 5.3957E+00 | −3.4529E+00 | 1.8454E+00 | 1.4110E+01 | −2.3345E+01 |
| A4 | −8.7272E−02 | −4.0097E−02 | 2.3026E−02 | −1.6611E−01 | −1.5251E−01 |
| A6 | −3.7529E−03 | −7.0239E−02 | −5.0004E−02 | 1.8825E−01 | 1.0004E−01 |
| A8 | 1.6655E−02 | 8.3803E−02 | 1.0248E−02 | −1.5807E−01 | −9.2584E−02 |
| A10 | −3.5032E−04 | 4.7280E−02 | −5.5580E−03 | 4.6607E−02 | 3.9566E−02 |
| A12 | −2.8231E−03 | −1.0646E−01 | 3.1541E−02 | 1.8515E−02 | −6.4824E−03 |
| A14 | −1.3632E−03 | −2.3831E−02 | −1.5097E−02 | −6.0737E−03 | 1.6355E−03 |
| A16 | 1.2893E−03 | 7.9736E−02 | −5.1793E−03 | −2.7032E−03 | −1.4750E−06 |

|  | S10 | S11 | S12 | S13 | S14 |
|---|---|---|---|---|---|
| K | 3.5895E+00 | 8.5912E+00 | −3.2957E−01 | −2.2629E−01 | −6.1878E+00 |
| A4 | 4.4216E−02 | 7.3722E−02 | 8.0543E−03 | −4.0345E−02 | −2.2305E−02 |
| A6 | −6.4071E−02 | −8.4884E−02 | −3.0077E−02 | 6.6159E−03 | 3.2816E−03 |
| A8 | 1.2276E−02 | 2.1237E−02 | 9.8181E−03 | −6.0018E−04 | −3.2983E−04 |
| A10 | 6.0574E−03 | 7.5277E−04 | −8.7080E−04 | 2.9916E−05 | 1.6175E−05 |
| A12 | −3.0587E−03 | −2.0947E−03 | −1.7341E−04 | −5.6897E−07 | 5.9075E−08 |
| A14 | −7.7033E−04 | 3.0595E−04 | 3.4393E−05 | −1.5104E−08 | −2.8350E−08 |
| A16 | 7.9097E−04 | 5.6422E−05 | −7.4106E−07 | 0.0000E+00 | 0.0000E+00 |

Figure 4:
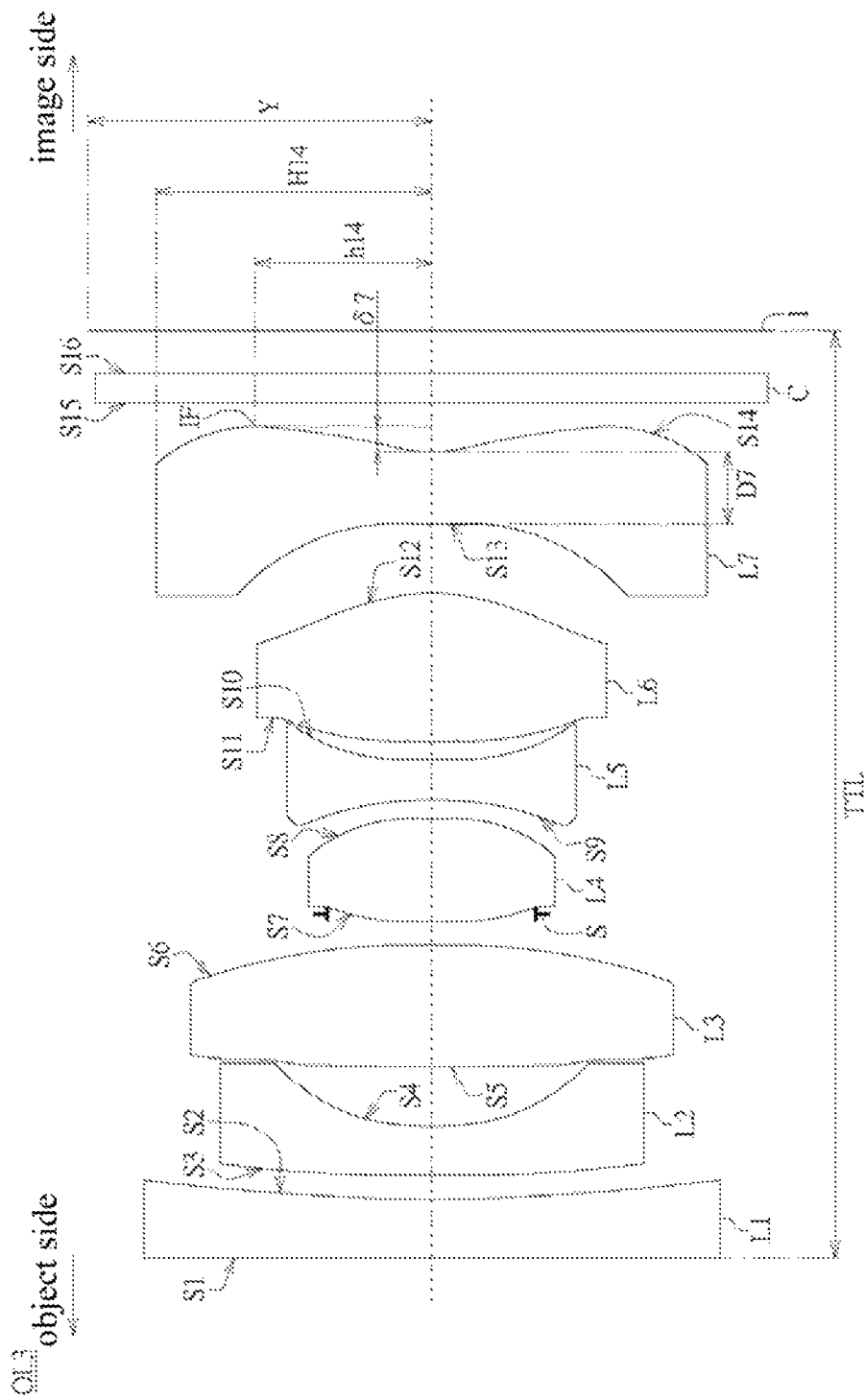
FIG. 4 is a schematic diagram of an optical lens in accordance with the other embodiment of the present disclosure.

FIG. 4 is a schematic diagram of an optical lens OL3 in accordance with the other embodiment of the present disclosure. The structure of the optical lens OL3 of this present embodiment is similar to the optical lens OL1, and the main difference from the optical lens OL1 is: the shapes and/or optical parameters of the lenses.

Table V presents details of an embodiment of the optical lens OL3, which includes refractive rate, thicknesses, refractive indexes, dispersion coefficients.

TABLE V

| Lens | Surface | Refractive Rate (mm) | Thickness (mm) | Refractive Index nd | Dispersion Coefficient vd |
|---|---|---|---|---|---|
| L1 | S1 | ∞ | 0.490 | 1.510 | 64.0 |
|    | S2 | 14.861 | 0.175 | | |
| L2 | S3 | 7.109 | 0.401 | 1.530 | 57.0 |
|    | S4 | 1.889 | 0.494 | | |
| L3 | S5 | 18.606 | 1.013 | 1.830 | 37.0 |
|    | S6 | −6.752 | 0.204 | | |
| St | S | ∞ | −0.052 | | |
| L4 | S7 | 2.765 | 0.879 | 1.530 | 57.0 |
|    | S8 | −1.978 | 0.105 | | |
| L5 | S9 | −7.701 | 0.348 | 1.630 | 23.0 |
|    | S10 | 2.361 | 0.152 | | |
| L6 | S11 | 6.177 | 1.210 | 1.530 | 57.0 |
|    | S12 | −1.608 | 0.576 | | |
| L7 | S13 | −5.975 | 0.579 | 1.530 | 57.0 |
|    | S14 | 1.835 | 0.402 | | |
| C | S15 | ∞ | 0.210 | 1.510 | 64.0 |
|    | S16 | ∞ | 0.370 | | |
|    | I | ∞ | | | |

In addition if surfaces of the second lens L2 and the fourth lens L4 to the seventh lens L7 are the aspheric surfaces, the each parameter of the aspheric equation is shown in Table VI.

TABLE VI

| | S3 | S4 | S7 | S8 | S9 |
|---|---|---|---|---|---|
| K | −1.1675E+01 | −3.2976E−01 | −2.9903E+00 | 1.5910E+00 | 6.5967E+00 |
| A4 | −8.7272E−02 | −4.0097E−02 | 2.3026E−02 | −1.6611E−01 | −1.5251E−01 |
| A6 | −3.7529E−03 | −7.0239E−02 | −5.0004E−02 | 1.8825E−01 | 1.0004E−01 |
| A8 | 1.6655E−02 | 8.3803E−02 | 1.0248E−02 | −1.5807E−01 | −9.2584E−02 |
| A10 | −3.5032E−04 | 4.7280E−02 | −5.5580E−03 | 4.6607E−02 | 3.9566E−02 |
| A12 | −2.8231E−03 | −1.0646E−01 | 3.1541E−02 | 1.8515E−02 | −6.4824E−03 |
| A14 | −1.3632E−03 | −2.3831E−02 | −1.5097E−02 | −6.0737E−03 | 1.6355E−03 |
| A16 | 1.2893E−03 | 7.9736E−02 | −5.1793E−03 | −2.7032E−03 | −1.4750E−06 |

| | S10 | S11 | S12 | S13 | S14 |
|---|---|---|---|---|---|
| K | −9.4936E+00 | 1.1134E+01 | −5.2660E+00 | 8.4829E−01 | −6.7818E−01 |
| A4 | 4.4216E−02 | 7.3722E−02 | 8.0543E−03 | −4.0345E−02 | −2.2305E−02 |
| A6 | −6.4071E−02 | −8.4884E−02 | −3.0077E−02 | 6.6159E−03 | 3.2816E−03 |
| A8 | 1.2276E−02 | 2.1237E−02 | 9.8181E−03 | −6.0018E−04 | −3.2983E−04 |
| A10 | 6.0574E−03 | 7.5277E−04 | −8.7080E−04 | 2.9916E−05 | 1.6175E−05 |
| A12 | −3.0587E−03 | −2.0947E−03 | −1.7341E−04 | −5.6897E−07 | 5.9075E−08 |
| A14 | −7.7033E−04 | 3.0595E−04 | 3.4393E−05 | −1.5104E−08 | −2.8350E−08 |
| A16 | 7.9097E−04 | 5.6422E−05 | −7.4106E−07 | 0.0000E+00 | 0.0000E+00 |

In addition, Table VII shows a comparison in accordance with Table I to Table VI of the present disclosures.

TABLE VII

| | Optical lens OL1 | Optical lens OL2 | Optical lens OL3 |
|---|---|---|---|
| F | 2.7 | 3.03 | 2.86 |
| Y | 8.05 | 9.11 | 5.86 |
| TTL | 8.05 | 9.11 | 7.56 |
| d | 0.188 | 0.182 | 0.151 |
| F/TTL | 0.33 | 0.39 | 0.37 |
| F/Y | 0.33 | 0.33 | 0.48 |
| d/F | 0.069 | 0.060 | 0.053 |
| R1 | ∞ | ∞ | ∞ |
| R2 | 7.952 | 1.972 | 14.861 |
| R2/R1 | 0.00 | 0.00 | 0.00 |
| h14 | 1.469 | 2.210 | 1.568 |
| H14 | 2.334 | 3.439 | 2.291 |
| \|h14/H14\| | 0.63 | 0.64 | 0.68 |
| δ7 | 0.15 | 0.25 | 0.19 |
| D7 | 0.58 | 0.75 | 0.58 |
| \|δ7/D7\| | 0.26 | 0.33 | 0.32 |
| FOV | 160 | 160 | 120 |
| FNO | 2.36 | 2.83 | 2.11 |
| (FNO × TTL)/(FOV × Y) | 0.014 | 0.017 | 0.022 |

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations may be made to the structure of the present invention without departing from the scope or spirit of the invention. In view of the foregoing, it is intended that the present invention cover modifications and variations of this invention provided they fall within the scope of the following claims.

What is claimed is:

1. An optical lens, from an object side to an image side, comprising:
    a first lens having a negative refractive power;
    a second lens having a refractive power;
    a third lens having a refractive power;
    a fourth lens having a positive refractive power;
    a fifth lens having a refractive power;
    a sixth lens having a refractive power; and
    a seventh lens having a negative refractive power;
    wherein the second lens has a positive refractive power, the third lens has a negative refractive power, the fifth lens has a positive refractive power, and the sixth lens has a negative refractive power; or, the second lens has a negative refractive power, the third lens has a positive refractive power, the fifth lens has a negative refractive power, and the sixth lens has a positive refractive power; wherein an image-side surface of the seventh lens has an inflection point, a distance from the inflection point to an optical axis is h14, a radius of the seventh lens is H14, and 0.5≤|h14/H14| and/or |h14/H14|≤0.8.

2. The optical lens of claim 1, further comprising a focal length F, and 0.25≤F/TTL and/or F/TTL≤0.45, wherein TTL is a distance from an object-side surface of the first lens to an image plane along an optical axis, or a substantially perpendicular distance from a center of the object-side surface of the first lens to the image plane.

3. The optical lens of claim 1, further comprising a focal length F and an image height Y, and 0.2≤F/Y and/or F/Y≤0.6.

4. The optical lens of claim 1, further comprising a field-of-view FOV, an image height Y and an aperture FNO, wherein (FNO×TTL)/(FOV×Y)≤0.03, wherein TTL is a distance from an object-side surface of the first lens to an image plane along an optical axis, or a substantially perpendicular distance from a center of the object-side surface of the first lens to the image plane.

5. The optical lens of claim 1, further comprising a focal length F, d is a distance between an image-side surface of the third lens and an object-side surface of the fourth lens, and 0.0≤d/F and/or d/F≤0.1.

6. The optical lens of claim 1, wherein the image-side surface and an optical axis intersects at an intersection, and a distance from the intersection to a projection of the inflection point on the optical axis is δ7, and |δ7/D7|≤0.4, wherein D7 is a thickness of the seventh lens along the optical axis or a center thickness of the seventh lens.

7. The optical lens of claim 1, wherein the optical lens further satisfies at least one of the following conditions:
an image-side surface of the first lens is a concave surface;
an object-side surface of the second lens is a convex surface;
an object-side surface of the third lens is a convex surface;
an object-side surface of the sixth lens is a convex surface; and
a portion of the image-side surface of the seventh lens near and/or around an optical axis is formed in a concave shape.

8. The optical lens of claim 1, wherein the optical lens further satisfies at least one of the following conditions: the first lens is a convex-concave lens, a biconcave lens or a plano-concave lens; the second lens is a convex-concave lens or a biconvex lens; the third lens is a biconvex lens or a convex-concave lens; the fourth lens is a biconvex lens; the fifth lens is a biconcave lens or a biconvex lens; the sixth lens is a biconvex lens or a convex-concave lens; or, the seventh lens is a biconcave lens or a convex-concave lens.

9. An optical lens, from an object side to an image side comprising:
a first lens having a negative refractive power;
a second lens having a refractive power,
a third lens having a refractive power;
a fourth lens having a positive refractive power;
a fifth lens having a refractive power;
a sixth lens having a refractive power, and
a seventh lens having a negative refractive power;
wherein the second lens has a positive refractive power, the third lens has a negative refractive power, the fifth lens has a positive refractive power, and the sixth lens has a negative refractive power; or, the second lens has a negative refractive power, the third lens has a positive refractive power, the fifth lens has a negative refractive power, and the sixth lens has a positive refractive power; and
wherein an object-side surface of the first lens has a refractive rate R1, an image-side surface of the first lens has a refractive rate R2, and |R2/R1|≤0.01.

10. The optical lens of claim 9, further comprising a focal length F, and 0.25≤F/TTL and/or F/TTL≤0.45, wherein TTL is a distance from the object-side surface of the first lens to an image plane along an optical axis, or a substantially perpendicular distance from a center of the object-side surface of the first lens to the image plane.

11. The optical lens of claim 9, further comprising a focal length F and an image height Y, and 0.2≤F/Y and/or F/Y≤0.6.

12. The optical lens of claim 9, further comprising a field-of-view FOV, an image height Y and an optical aperture FNO, and (FNO×TTL)/(FOV×Y)≤0.03, wherein TTL is a distance from the object-side surface of the first lens to an image plane along an optical axis, or a substantially perpendicular distance from a center of the object-side surface of the first lens to the image plane.

13. The optical lens of claim 9, further comprising a focal length F, d is a distance between an image-side surface of the third lens and an object-side surface of the fourth lens, and 0.0≤d/F and/or d/F≤0.1.

14. The optical lens of claim 9, wherein an image-side surface of the seventh lens has an inflection point, a distance from the inflection point to an optical axis is h14, a radius of the seventh lens is H14, and 0.5≤|h14/H14| and/or |h14/H4|≤0.8.

15. The optical lens of claim 9, wherein an image-side surface of the seventh lens has an inflection point, the image-side surface of the seventh lens and an optical axis intersects at an intersection, a distance from the intersection to a projection of the inflection point on the optical axis is δ7, and |δ7/D7|≤0.4, wherein D7 is a thickness of the seventh lens along the optical axis, or D7 is a center thickness of the seventh lens.

16. The optical lens of claim 9, wherein the optical lens further satisfies at least one of the following conditions:
an image-side surface of the first lens is a concave surface;
an object-side surface of the second lens is a convex surface;
an object-side surface of the third lens is a convex surface;
an object-side surface of the sixth lens is a convex surface; and
a portion of the image-side surface of the seventh lens near and/or around an optical axis is formed in a concave shape.

17. The optical lens of claim 9, wherein the first lens is a convex-concave lens, a biconcave lens or a piano-concave lens; the second lens is a convex-concave lens or a biconvex lens; the third lens is a biconvex lens or a convex-concave lens; the fourth lens is a biconvex lens; the fifth lens is a biconcave lens or a biconvex lens; the sixth lens is a biconvex lens or a convex-concave lens; or, the seventh lens is a biconcave lens or a convex-concave lens.

18. An optical lens, from an object side to an image side, comprising:
a first lens having a negative refractive power;
a second lens having a refractive power;
a third lens having a refractive power;
a fourth lens having a positive refractive power;
a fifth lens having a refractive power;
a sixth lens having a refractive power, and
a seventh lens having a negative refractive power;

wherein the second lens and has a positive refractive power, the third lens has a negative refractive power, the fifth lens has a positive refractive power, and the sixth lens has a negative refractive power; or, the second lens has a negative refractive power, the third lens has a positive refractive power, the fifth lens has a negative refractive power, and the sixth lens has a positive refractive power; wherein an image-side surface of the seventh lens has an inflection point, the image-side surface and an optical axis intersects at an intersection, and a distance from the intersection to a projection of the inflection point on the optical axis is δ7, and |δ7/D7|≤0.4, wherein D7 is a thickness of the seventh lens along the optical axis or a center thickness of the seventh lens.

* * * * *